(12) United States Patent
Ikizyan

(10) Patent No.: US 10,652,512 B1
(45) Date of Patent: May 12, 2020

(54) ENHANCEMENT OF HIGH DYNAMIC RANGE CONTENT

(71) Applicant: QUALCOMM Incorporated, San Diego, CA (US)

(72) Inventor: Ike Ikizyan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/197,296

(22) Filed: Nov. 20, 2018

(51) Int. Cl.
*H04N 19/98* (2014.01)
*H04N 9/64* (2006.01)
*H04N 11/08* (2006.01)
*G06F 17/11* (2006.01)

(52) U.S. Cl.
CPC ............ *H04N 9/646* (2013.01); *G06F 17/11* (2013.01); *H04N 11/08* (2013.01)

(58) Field of Classification Search
CPC ................................ H04N 19/167; H04N 7/12
See application file for complete search history.

(56) References Cited

U.S. PATENT DOCUMENTS

| | | | | | |
|---|---|---|---|---|---|
| 5,670,986 | A * | 9/1997 | Leak | ................ | G06T 3/4015 345/593 |
| 6,118,820 | A * | 9/2000 | Reitmeier | ............ | H04N 19/103 375/240.16 |
| 6,560,285 | B1 * | 5/2003 | Reitmeier | ........ | H04N 21/23614 375/240.16 |
| 2003/0202589 | A1 * | 10/2003 | Reitmeier | ........ | H04N 21/23614 375/240.12 |
| 2007/0035707 | A1 * | 2/2007 | Margulis | ................ | G03B 21/26 353/122 |
| 2016/0077367 | A1 * | 3/2016 | Lo | ......................... | G09G 3/3648 349/25 |
| 2016/0330513 | A1 * | 11/2016 | Toma | ........................ | H04N 5/57 |
| 2016/0358584 | A1 * | 12/2016 | Greenebaum | ............ | G09G 5/02 |
| 2017/0070745 | A1 * | 3/2017 | Lee | ........................ | H04N 19/513 |
| 2017/0255225 | A1 * | 9/2017 | Lilja | ........................ | G06F 1/12 |
| 2018/0070107 | A1 * | 3/2018 | Ramasubramonian | ................... | H04N 19/156 |
| 2018/0075798 | A1 * | 3/2018 | Nho | ........................ | G09G 3/32 |
| 2019/0007709 | A1 * | 1/2019 | Oh | ........................ | H04L 65/4084 |
| 2019/0104309 | A1 * | 4/2019 | Su | ........................ | H04N 19/124 |

* cited by examiner

*Primary Examiner* — Paulos M Natnael
(74) *Attorney, Agent, or Firm* — Arent Fox, LLP

(57) ABSTRACT

The present disclosure relates to methods and devices for video processing. In one aspect, the device may obtain a video stream with a plurality of frames. The device can also map, for each frame of the plurality of frames, a first luminance level associated with the frame to a second luminance level based on a transfer function. In some aspects, the transfer function can also include a first function for a first luminance level range and a second function for a second luminance level range, the first function being non-linear and the second function being polynomial. Additionally, the device can indicate, for each frame of the plurality frames, the second luminance level within the video stream. Moreover, the transfer function can include a third function for a third luminance level range, wherein the third function may be between the first and second functions.

30 Claims, 8 Drawing Sheets

800

802
Obtain a video stream with a plurality of frames

804
Map, for each frame of the plurality of frames, a first luminance level associated with the frame to a second luminance level based on a transfer function 806
Indicate, for each frame of the plurality frames, the second luminance level within the video stream

ENHANCEMENT OF HIGH DYNAMIC RANGE CONTENT

TECHNICAL FIELD

The present disclosure relates generally to processing systems and, more particularly, to one or more techniques for video processing in processing systems.

INTRODUCTION

Computing devices often utilize a video processor or graphics processing unit (GPU) to accelerate the rendering of video or graphical data for display. Such computing devices may include, for example, computer workstations, mobile phones such as so-called smartphones, embedded systems, personal computers, tablet computers, and video game consoles. Video processors or GPUs execute a video or graphics processing pipeline that includes a plurality of processing stages that operate together to execute video or graphics processing commands and output a frame. A central processing unit (CPU) may control the operation of the video processor or GPU by issuing one or more graphics processing commands to the video processor or GPU. Modern day CPUs are typically capable of concurrently executing multiple applications, each of which may need to utilize the video processor or GPU during execution. A device that provides content for visual presentation on a display generally includes a video processor or GPU.

Typically, a video processor or GPU of a device is configured to perform every process in a video or graphics processing pipeline. However, with the advent of wireless communication and the streaming of content, e.g., game content or any other content that is rendered using a GPU, there has developed a need for distributed video or graphics processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a first apparatus are provided. The apparatus may be a video processor. In one aspect, the apparatus may obtain a video stream with a plurality of frames. The apparatus can also map, for each frame of the plurality of frames, a first luminance level associated with the frame to a second luminance level based on a transfer function. In some aspects, the transfer function can also include a first function for a first luminance level range and a second function for a second luminance level range, the first function being non-linear and the second function being polynomial. Additionally, the apparatus can indicate, for each frame of the plurality frames, the second luminance level within the video stream.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
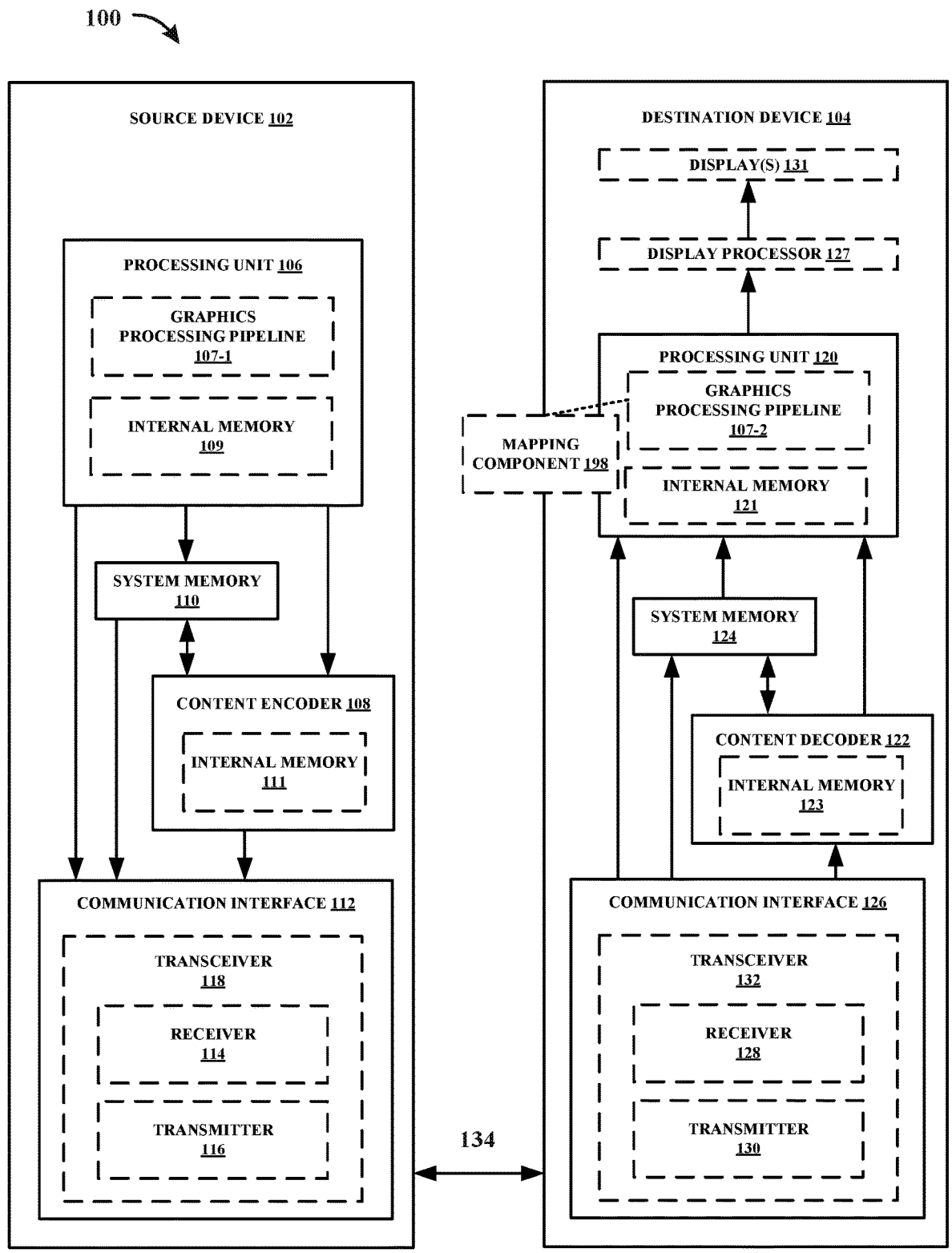
FIG. 1 is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include video processors, microprocessors, microcontrollers, graphics processing units (GPUs), general purpose GPUs (GPGPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a distributed graphics processing pipeline across multiple devices, improving the coding of video or graphical content, and/or reducing the load of a processing unit (i.e., any processing unit configured to perform one or more techniques described herein, such as a graphics processing unit (GPU)). For example, this disclosure describes techniques for graphics processing in communication systems. Other example benefits are described throughout this disclosure.

As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding. As used herein, the terms "encode" and "compress" may be used interchangeably. Similarly, the terms "decode" and "decompress" may be used interchangeably.

As used herein, instances of the term "content" may refer to the term "video," "graphical content," "image," and vice versa. This is true regardless of whether the terms are being used as an adjective, noun, or other part of speech. For example, reference to a "content coder" may include reference to a "video coder," "graphical content coder," or "image coder,"; and reference to a "video coder," "graphical content coder," or "image coder" may include reference to a "content coder." As another example, reference to a processing unit providing content to a content coder may include reference to the processing unit providing graphical content to a video encoder. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended)

As referenced herein, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1 is a block diagram that illustrates an example content generation and coding system 100 configured to implement one or more techniques of this disclosure. The content generation and coding system 100 includes a source device 102 and a destination device 104. In accordance with the techniques described herein, the source device 102 may be configured to encode, using the content encoder 108, graphical content generated by the processing unit 106 prior to transmission to the destination device 104. The content encoder 108 may be configured to output a bitstream having a bit rate. The processing unit 106 may be configured to control and/or influence the bit rate of the content encoder 108 based on how the processing unit 106 generates graphical content.

The source device 102 may include one or more components (or circuits) for performing various functions described herein. The destination device 104 may include one or more components (or circuits) for performing various functions described herein. In some examples, one or more components of the source device 102 may be components of a system-on-chip (SOC). Similarly, in some examples, one or more components of the destination device 104 may be components of an SOC.

The source device 102 may include one or more components configured to perform one or more techniques of this disclosure. In the example shown, the source device 102 may include a processing unit 106, a content encoder 108, a system memory 110, and a communication interface 112. The processing unit 106 may include an internal memory 109. The processing unit 106 may be configured to perform graphics processing, such as in a graphics processing pipeline 107-1. The content encoder 108 may include an internal memory 111.

Memory external to the processing unit 106 and the content encoder 108, such as system memory 110, may be accessible to the processing unit 106 and the content encoder 108. For example, the processing unit 106 and the content encoder 108 may be configured to read from and/or write to external memory, such as the system memory 110. The processing unit 106 and the content encoder 108 may be communicatively coupled to the system memory 110 over a bus. In some examples, the processing unit 106 and the content encoder 108 may be communicatively coupled to each other over the bus or a different connection.

The content encoder 108 may be configured to receive graphical content from any source, such as the system memory 110 and/or the processing unit 106. The system memory 110 may be configured to store graphical content generated by the processing unit 106. For example, the processing unit 106 may be configured to store graphical content in the system memory 110. The content encoder 108 may be configured to receive graphical content (e.g., from the system memory 110 and/or the processing unit 106) in the form of pixel data. Otherwise described, the content encoder 108 may be configured to receive pixel data of graphical content produced by the processing unit 106. For example, the content encoder 108 may be configured to receive a value for each component (e.g., each color component) of one or more pixels of graphical content. As an example, a pixel in the red (R), green (G), blue (B) (RGB) color space may include a first value for the red component, a second value for the green component, and a third value for the blue component.

The internal memory 109, the system memory 110, and/or the internal memory 111 may include one or more volatile or non-volatile memories or storage devices. In some examples, internal memory 109, the system memory 110, and/or the internal memory 111 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 109, the system memory 110, and/or the internal memory 111 may be a non-transitory storage medium according to some examples. The term "non-transitory" may indicate that the storage medium is not embodied in a carrier wave or a propagated signal. However, the term "non-transitory" should not be interpreted to mean that internal memory 109, the system memory 110, and/or the internal memory 111 is non-movable or that its contents are static. As one example, the system memory 110 may be removed from the source device 102 and moved to another device. As another example, the system memory 110 may not be removable from the source device 102.

The processing unit 106 may be a central processing unit (CPU), a graphics processing unit (GPU), a general purpose GPU (GPGPU), or any other processing unit that may be configured to perform graphics processing. In some examples, the processing unit 106 may be integrated into a motherboard of the source device 102. In some examples, the processing unit 106 may be may be present on a graphics card that is installed in a port in a motherboard of the source device 102, or may be otherwise incorporated within a peripheral device configured to interoperate with the source device 102.

The processing unit 106 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 106 may store instructions for the software in a suitable, non-transitory computer-readable storage medium (e.g., internal memory 109), and may execute the instructions in hardware using one or more processors to perform the techniques of this disclosure. Any of the foregoing (including hardware, software, a combination of hardware and software, etc.) may be considered to be one or more processors.

The content encoder 108 may be any processing unit configured to perform content encoding. In some examples, the content encoder 108 may be integrated into a motherboard of the source device 102. The content encoder 108 may include one or more processors, such as one or more video processors, microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 108 may store instructions for the software in a suitable, non-transitory computer-readable storage medium (e.g., internal memory 111), and may execute the instructions in hardware using one or more processors to perform the techniques of this disclosure. Any of the foregoing (including hardware, software, a combination of hardware and software, etc.) may be considered to be one or more processors.

The communication interface 112 may include a receiver 114 and a transmitter 116. The receiver 114 may be configured to perform any receiving function described herein with respect to the source device 102. For example, the receiver 114 may be configured to receive information from the destination device 104, which may include a request for content. In some examples, in response to receiving the request for content, the source device 102 may be configured to perform one or more techniques described herein, such as to produce or otherwise generate graphical content for delivery to the destination device 104. The transmitter 116 may be configured to perform any transmitting function described herein with respect to the source device 102. For example, the transmitter 116 may be configured to transmit encoded content to the destination device 104, such as encoded graphical content produced by the processing unit 106 and the content encoder 108 (i.e., the graphical content is produced by the processing unit 106, which the content encoder 108 receives as input to produce or otherwise generate the encoded graphical content). The receiver 114 and the transmitter 116 may be combined into a transceiver 118. In such examples, the transceiver 118 may be configured to perform any receiving function and/or transmitting function described herein with respect to the source device 102.

The destination device 104 may include one or more components configured to perform one or more techniques of this disclosure. In the example shown, the destination device 104 may include a processing unit 120, a content decoder 122, a system memory 124, a communication interface 126, and one or more displays 131. Reference to the display 131 may refer to the one or more displays 131. For example, the display 131 may include a single display or a plurality of displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 120 may include an internal memory 121. The processing unit 120 may be configured to perform video or graphics processing, such as in a graphics processing pipeline 107-2. The content decoder 122 may include an internal memory 123. In some examples, the destination device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display content that was generated using decoded content. For example, the display processor 127 may be configured to process one or more frames generated by the processing unit 120, where the one or more frames are generated by the processing unit 120 by using decoded content that was derived from encoded content received from the source device 102. In turn the display processor 127 may be configured to perform display processing on the one or more frames generated by the processing unit 120. The one or more displays 131 may be configured to display or otherwise present frames processed by the display processor 127. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content decoder 122, such as system memory 124, may be accessible to the processing unit 120 and the content decoder 122. For example, the processing unit 120 and the content decoder 122 may be configured to read from and/or write to external memory, such as the system memory 124. The processing unit 120 and the content decoder 122 may be communicatively coupled to the system memory 124 over a bus. In some examples, the processing unit 120 and the content decoder 122 may be communicatively coupled to each other over the bus or a different connection.

The content decoder 122 may be configured to receive graphical content from any source, such as the system memory 124 and/or the communication interface 126. The system memory 124 may be configured to store received encoded graphical content, such as encoded graphical content received from the source device 102. The content decoder 122 may be configured to receive encoded graphical content (e.g., from the system memory 124 and/or the communication interface 126) in the form of encoded pixel data. The content decoder 122 may be configured to decode encoded graphical content.

The internal memory 121, the system memory 124, and/or the internal memory 123 may include one or more volatile or non-volatile memories or storage devices. In some examples, internal memory 121, the system memory 124, and/or the internal memory 123 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 121, the system memory 124, and/or the internal memory 123 may be a non-transitory storage medium according to some examples. The term "non-transitory" may indicate that the storage medium is not embodied in a carrier wave or a propagated signal. However, the term "non-transitory" should not be interpreted to mean that internal memory 121, the system memory 124, and/or the internal memory 123 is non-movable or that its contents are static. As one example, the system memory 124 may be removed from the destination device 104 and moved to another device. As another example, the system memory 124 may not be removable from the destination device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the destination device 104. In some examples, the processing unit 120 may be may be present on a graphics card that is installed in a port in a motherboard of the destination device 104, or may be otherwise incorporated within a peripheral device configured to interoperate with the destination device 104.

The processing unit 120 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., internal memory 121), and may execute the instructions in hardware using one or more processors to perform the techniques of this disclosure. Any of the foregoing (including hardware, software, a combination of hardware and software, etc.) may be considered to be one or more processors.

The content decoder 122 may be any processing unit configured to perform content decoding. In some examples, the content decoder 122 may be integrated into a motherboard of the destination device 104. The content decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content decoder 122 may store instructions for the software in a suitable, non-transitory computer-readable storage medium (e.g., internal memory 123), and may execute the instructions in hardware using one or more processors to perform the techniques of this disclosure. Any of the foregoing (including hardware, software, a combination of hardware and software, etc.) may be considered to be one or more processors.

The communication interface 126 may include a receiver 128 and a transmitter 130. The receiver 128 may be configured to perform any receiving function described herein with respect to the destination device 104. For example, the receiver 128 may be configured to receive information from the source device 102, which may include encoded content, such as encoded graphical content produced or otherwise generated by the processing unit 106 and the content encoder 108 of the source device 102 (i.e., the graphical content is produced by the processing unit 106, which the content encoder 108 receives as input to produce or otherwise generate the encoded graphical content). As another example, the receiver 114 may be configured to receive position information from the destination device 104, which may be encoded or unencoded (i.e., not encoded). Additionally, the receiver 128 may be configured to receive position information from the source device 102. In some examples, the destination device 104 may be configured to decode encoded graphical content received from the source device 102 in accordance with the techniques described herein. For example, the content decoder 122 may be configured to decode encoded graphical content to produce or otherwise generate decoded graphical content. The processing unit 120 may be configured to use the decoded graphical content to produce or otherwise generate one or more frames for presentment on the one or more displays 131. The transmitter 130 may be configured to perform any transmitting function described herein with respect to the destination device 104. For example, the transmitter 130 may be configured to transmit information to the source device 102, which may include a request for content. The receiver 128 and the transmitter 130 may be combined into a transceiver 132. In such examples, the transceiver 132 may be configured to perform any receiving function and/or transmitting function described herein with respect to the destination device 104.

The content encoder 108 and the content decoder 122 of content generation and coding system 100 represent examples of computing components (e.g., processing units) that may be configured to perform one or more techniques for encoding content and decoding content in accordance with various examples described in this disclosure, respectively. In some examples, the content encoder 108 and the content decoder 122 may be configured to operate in accordance with a content coding standard, such as a video coding standard, a display stream compression standard, or an image compression standard.

As shown in FIG. 1, the source device 102 may be configured to generate encoded content. Accordingly, the source device 102 may be referred to as a content encoding device or a content encoding apparatus. The destination device 104 may be configured to decode the encoded content generated by source device 102. Accordingly, the destination device 104 may be referred to as a content decoding device or a content decoding apparatus. In some examples, the source device 102 and the destination device 104 may be separate devices, as shown. In other examples, source device 102 and destination device 104 may be on or part of the same computing device. In either example, a graphics processing pipeline may be distributed between the two devices. For example, a single graphics processing pipeline may include a plurality of video or graphics processes. The graphics processing pipeline 107-1 may include one or more video or graphics processes of the plurality of video or graphics processes. Similarly, graphics processing pipeline 107-2 may include one or more video or graphics processes of the plurality of video or graphics processes. In this regard, the graphics processing pipeline 107-1 concatenated or otherwise followed by the graphics processing pipeline 107-2 may result in a full video or graphics processing pipeline. Otherwise described, the graphics processing pipeline 107-1 may be a partial video or graphics processing pipeline and the graphics processing pipeline 107-2 may be a partial video or graphics processing pipeline that, when combined, result in a distributed video or graphics processing pipeline.

Referring again to FIG. 1, in certain aspects, the graphics processing pipeline 107-2 may include an obtainment component configured to obtain a video stream with a plurality of frames. The graphics processing pipeline 107-2 may also include a mapping component 198 configured to map, for each frame of the plurality of frames, a first luminance level associated with the frame to a second luminance level based on a transfer function. The transfer function can also include a first function for a first luminance level range and a second function for a second luminance level range, the first function being non-linear and the second function being polynomial. Moreover, the graphics processing pipeline 107-2 may include an indication component configured to indicate, for each frame of the plurality frames, the second luminance level within the video stream. By distributing the graphics processing pipeline between the source device 102 and the destination device 104, the destination device may be able to, in some examples, present graphical content that it otherwise would not be able to render; and, therefore, could not present. Other example benefits are described throughout this disclosure.

As described herein, a device, such as the source device 102 and/or the destination device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 102 may be configured to communicate with the destination device 104. For example, destination device 104 may be configured to receive encoded content from the source device 102. In some example, the communication coupling between the source device 102 and the destination device 104 is shown as link 134. Link 134 may comprise any type of medium or device capable of moving the encoded content from source device 102 to the destination device 104.

In the example of FIG. 1, link 134 may comprise a communication medium to enable the source device 102 to transmit encoded content to destination device 104 in real-time. The encoded content may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 102 to the destination device 104. In other examples, link 134 may be a point-to-point connection between source device 102 and destination device 104, such as a wired or wireless display link connection (e.g., an HDMI link, a DisplayPort link, MIPI DSI link, or another link over which encoded content may traverse from the source device 102 to the destination device 104.

In another example, the link 134 may include a storage medium configured to store encoded content generated by the source device 102. In this example, the destination device 104 may be configured to access the storage medium. The storage medium may include a variety of locally-accessed data storage media such as Blu-ray discs, DVDs, CD-ROMs, flash memory, or other suitable digital storage media for storing encoded content.

In another example, the link 134 may include a server or another intermediate storage device configured to store encoded content generated by the source device 102. In this example, the destination device 104 may be configured to access encoded content stored at the server or other intermediate storage device. The server may be a type of server capable of storing encoded content and transmitting the encoded content to the destination device 104.

Devices described herein may be configured to communicate with each other, such as the source device 102 and the destination device 104. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices is inclusive of more than two devices. For example, a first device may communicatively couple with a second device and the first device may communicatively couple with a third device. In such an example, the first device may be a server.

With reference to FIG. 1, the source device 102 may be described as being communicatively coupled to the destination device 104. In some examples, the term "communicatively coupled" may refer to a communication connection, which may be direct or indirect. The link 134 may, in some examples, represent a communication coupling between the source device 102 and the destination device 104. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 102, may be configured to unicast, broadcast, multicast, or otherwise transmit information (e.g., encoded content) to one or more other devices (e.g., one or more destination devices, which includes the destination device 104). The destination device 104 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described herein, such as the source device 102 and the destination device 104, may be configured to operate in accordance with one or more communication protocols. For example, the source device 102 may be configured to communicate with (e.g., receive information from and/or transmit information to) the destination device 104 using one or more communication protocols. In such an example, the source device 102 may be described as communicating with the destination device 104 over a connection. The connection may be compliant or otherwise be in accordance with a communication protocol. Similarly, the destination device 104 may be configured to communicate with (e.g., receive information from and/or transmit information to) the source device 102 using one or more communication protocols. In such an example, the destination device 104 may be described as communicating with the source device 102 over a connection. The connection may be compliant or otherwise be in accordance with a communication protocol.

As used herein, the term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, or 5G.

With reference to FIG. 1, the content encoder 108 may be configured to encode video or graphical content. In some examples, the content encoder 108 may be configured to encode video or graphical content as one or more video frames. When the content encoder 108 encodes content, the content encoder 108 may generate a bitstream. The bitstream may have a bit rate, such as bits/time unit, where time unit is any time unit, such as second or minute. The bitstream may include a sequence of bits that form a coded representation of the video or graphical content and associated data. To generate the bitstream, the content encoder 108 may be configured to perform encoding operations on pixel data, such as pixel data corresponding to a shaded texture atlas. For example, when the content encoder 108 performs encoding operations on image data (e.g., one or more blocks of a shaded texture atlas) provided as input to the content encoder 108, the content encoder 108 may generate a series of coded images and associated data. The associated data may include a set of coding parameters such as a quantization parameter (QP).

Some aspects of the present disclosure can convert or map high dynamic range (HDR) video content. HDR video seeks to represent a dynamic range of light that is closer to the way light is actually depicted in the real world. For instance, real world objects such as the sun are extremely bright, so video displays are not capable of equaling the actual brightness of these objects. The unit of measurement of the luminance of an object, or the intensity of visible light, is a nit, wherein one nit is equal to one candela per square meter. For example, video displays may be capable of displaying a peak brightness of 500 nits, but real world objects like the sun can display a brightness of 100,000 nits. Accordingly, video displays cannot capture the actual brightness of objects as measured in the real world.

Operations such as tone mapping can help to convert the brightness of objects in an image to a video display. More specifically, tone mapping is the remapping of brightness information in an input image so that it can fit into the brightness capabilities of a video display. Essentially, tone mapping attempts to map the large brightness range of real world content in an image to the smaller brightness range of a video display. One goal of tone mapping is to avoid clipping, i.e., processing an image where the intensity in a certain area falls outside the minimum and/or maximum brightness which can be represented. Tone mapping may be needed to render HDR content on a display with a smaller dynamic range. Indeed, when dealing with high dynamic range content, a tone mapping operation may be necessary to adapt to a video display that has a smaller dynamic range.

Figure 2:
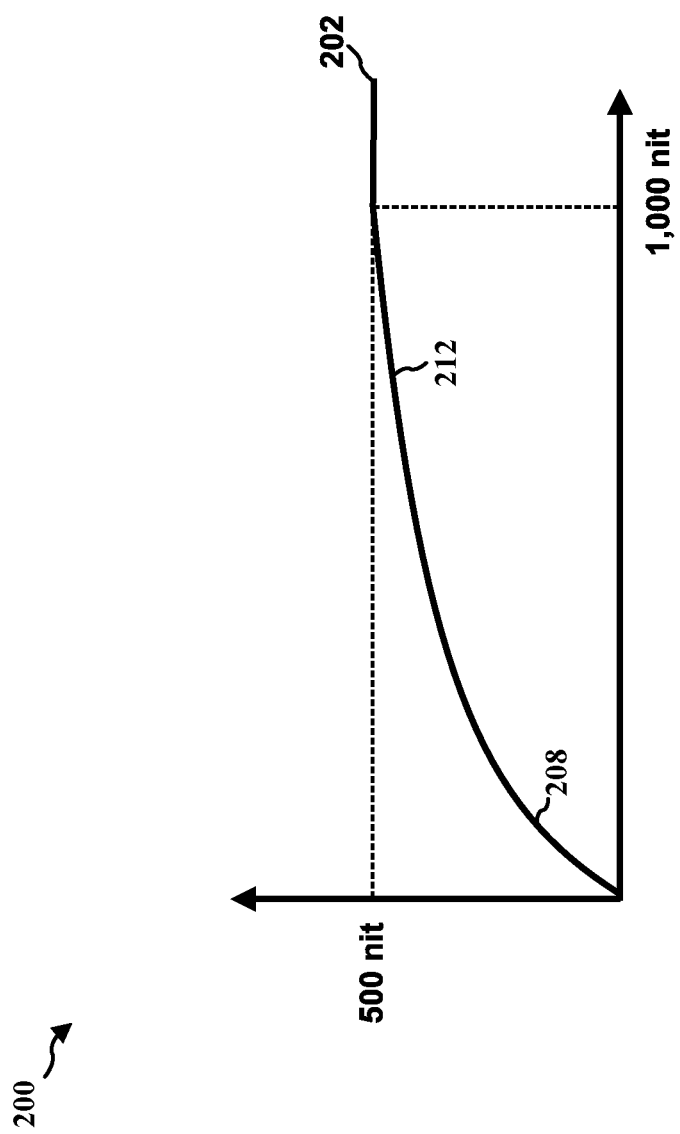
FIG. 2 illustrates an example of tone mapping according to the present disclosure.

FIG. 2 illustrates one example of tone mapping 200 according to the present disclosure. FIG. 2 shows a 1000 nit image on the x-axis being mapped to a 500 nit video display on the y-axis. Tonal curve 202 is the mapping instruction for this particular tone mapping. As shown in FIG. 2, tonal curve 202 includes a low luminance section 208 and a high luminance section 212. FIG. 2 displays a greater amount of compression in the tonal curve 202 at the high luminance section 212, e.g., the high end of the brightness scale, compared to the low luminance section 208, e.g., the low end of the brightness scale. In some aspects, an increased compression, e.g., a lower slope, in tonal curve 202 may result in a decreased ability to distinguish the different brightness levels in this luminance range of the mapped image. For instance, in tone mapping 200, the greater compression in the high luminance section 212 results in a greater number of brightness details in an image being mapped to a fewer number of brightness details in the video display. Accordingly, brightness levels in the low luminance section 208 may be more easily distinguished compared to brightness levels in the high luminance section 212. Mapping in a more horizontal line can result in the saturation of brightness levels, i.e., similar brightness levels blending together in an indistinguishable manner. In contrast, mapping with a higher slope can result in a greater preservation of contrast in the corresponding luminance range when output on the video display. Accordingly, a higher slope in tonal curve 202 can result in increased brightness preservation for that luminance range. As shown in FIG. 2, when mapping the 1000 nit image to the 500 nit video display, tonal curve 202 is more compressed in high luminance section 212, which will result in a greater brightness saturation in the high brightness tones. Tonal curve 202 has a higher slope in low luminance section 208, which can result in more brightness preservation at low brightness tones in the image.

As indicated above, tone mapping 200 can be used to map the brightness information in an input image or frame to fit the brightness capabilities of a video display. Tone mapping 200 can map a larger luminance range of content in an image or frame, e.g., 1000 nits, to a smaller luminance range of a video display, e.g. 500 nits. Accordingly, the present disclosure can receive an image or frame including a range of luminance information and use tone mapping 200 to convert the luminance information of the image or frame to the luminance information of the display. Once tone mapping 200 converts the luminance information of the image or frame to the luminance information of the display, the display can output the newly converted luminance information.

In order to set up an accurate tone mapping, aspects of the present disclosure may require the dynamic range distribution of content and information about the video display. Some aspects of HDR can provide limited information about the dynamic range distribution of content. Tone mapping can also be subject to certain sensitivities, such as a static metadata sensitivity. Static metadata can provide information regarding the maximum pixel value in the entire video content, from which a tone map can be designed. Also, the maximum content luminance level (MaxCLL) can be used for normalization in a static tone mapper. In some aspects, spurious pixels can significantly influence tone mapping results. In these instances, the static metadata may attempt to characterize the entire video stream with a single peak luminance value, e.g., the MaxCLL, even though there can be large variations in dynamic range between scenes. In some instances, using the MaxCLL to achieve a tone mapping solution may result in an inaccurate tone mapping. For example, a single pixel may adjust the MaxCLL value, which can disrupt the entire tone mapping. Indeed, as static metadata may be too sensitive to be useful, some aspects of the present disclosure may ignore the MaxCLL in the tone mapping solution.

Figure 3:
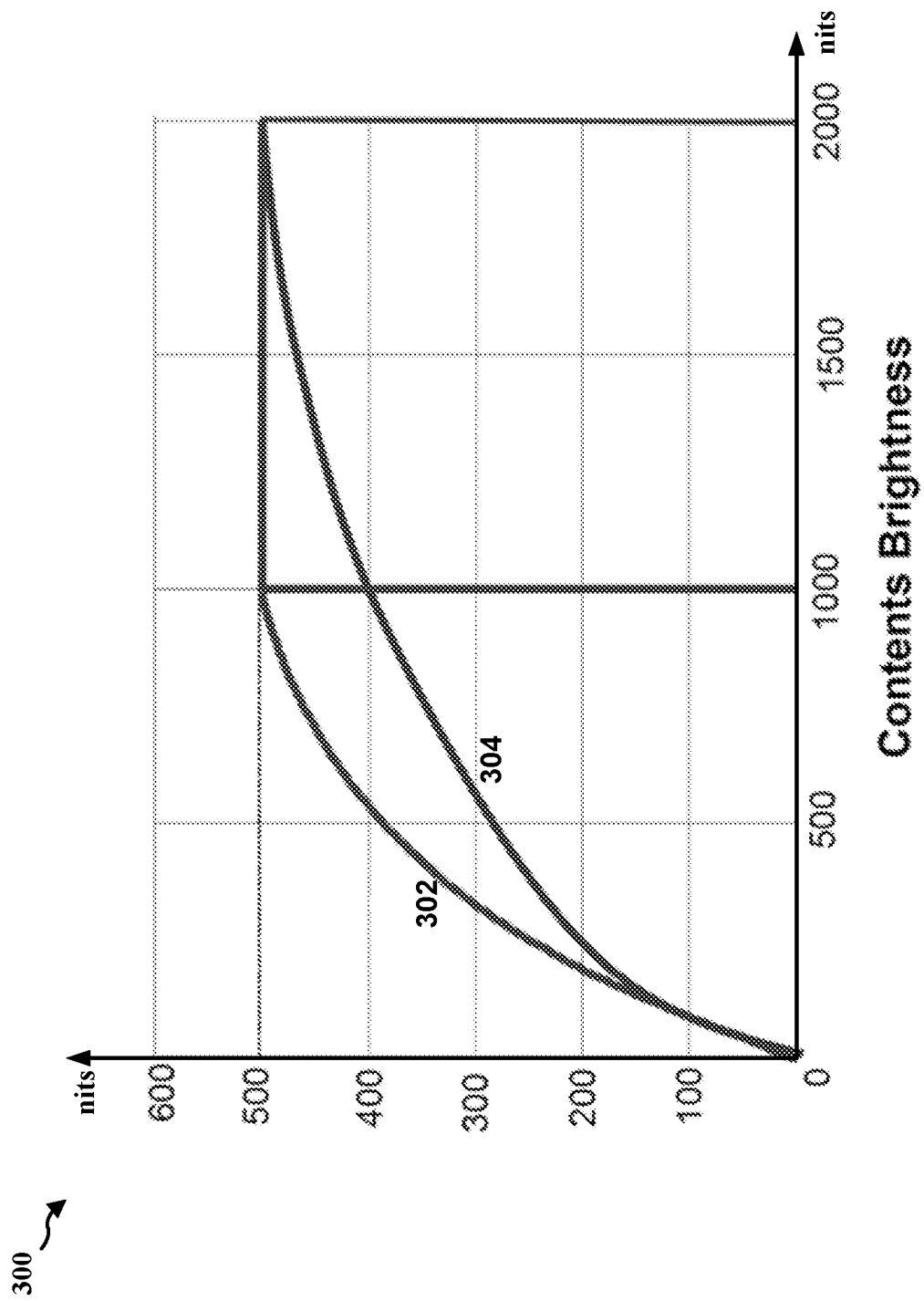
FIG. 3 illustrates another example of tone mapping according to the present disclosure.

FIG. 3 illustrates another example of tone mapping 300 according to the present disclosure. FIG. 3 displays how different content brightness levels of an image or frame can affect the corresponding tone mappings. For example, FIG. 3 shows tone mapping curve 302 corresponding to a content brightness of 1000 nits and tone mapping curve 304 corresponding to a content brightness of 2000 bits. Both tone mapping curves 302 and 304 map to a display of 500 nits. Also, FIG. 3 shows how a MaxCLL of 1000 nits compared to a MaxCLL of 2000 nits can cause a large variation in tone mapping. As mentioned above, when using static metadata, a single pixel can disrupt the MaxCLL of the image or frame and adjust the corresponding tone mapping curve. For instance, a single pixel with a value of 2000 nits can cause the MaxCLL to be set to 2000 nits, and correspondingly adjust the entire tone mapping curve, even if the remaining pixels have a maximum value of 1000 nits. Indeed, a spurious pixel with a value of 2000 nits can cause the entire tone mapping of an image to move from tone mapping curve 302, i.e., the 1000 nit curve, to tone mapping curve 304, i.e., the 2000 nit curve.

In some aspects, if the MaxCLL in a set of images or frames is greater than 1000 nits, the tone mapping curve 304 may be selected for mapping the brightness levels in the set of images, whereas if the MaxCLL in the set of images is less than or equal to 1000 nits, the tone mapping curve 302 may be selected for mapping the brightness levels in the set of images. When the tone mapping curve 302 is used, a greater mapping range is provided for darker details (e.g., 0 nits to 500 nits are mapped to between 0 nits and ~390 nits) than is provided by the tone mapping curve 304 (e.g., 0 nits to 500 nits are mapped to between 0 nits and ~280 nits). Therefore, the use of tone mapping curve 302 can better distinguish darker details compared to the use of tone mapping curve 304. For example, a single pixel with a luminance value of x, where x is greater than 1000, can cause the MaxCLL to be set to x. As the MaxCLL will now be set to a luminance value greater than 1000 nits, this can result in the use of tone mapping curve 304, rather than tone mapping curve 302. Accordingly, a single pixel can adjust the selected tone mapping curve, which can cause a reduction in the ability to distinguish darker details.

When tone mapping a sequence of video scenes, the metadata may not change from one scene to next. In some instances, tone mapping this constant metadata over multiple changing scenes can force a decision between displaying more high luminance details or low luminance details. For example, the selected tone mapping solution can be a compromise between a greater amount of high luminance level details or a greater amount of low luminance level details. In some aspects, the brightness levels can be mapped in a straight line until a deviation point, i.e., when the aforementioned brightness compromise is made. However, in other aspects, the metadata may not change from one scene to the next.

Figure 4:
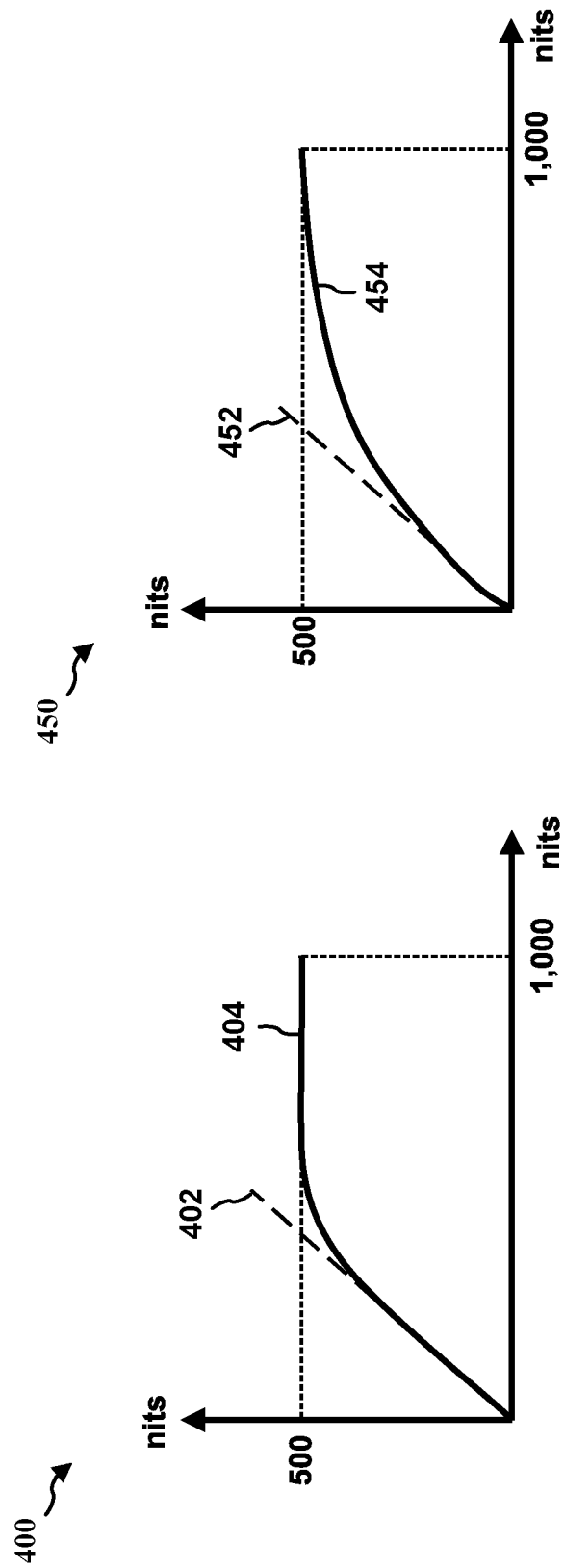
FIGS. 4A and 4B illustrate other examples of tone mapping according to the present disclosure.

FIGS. 4A and 4B illustrate tone mapping 400 and tone mapping 450, respectively, according to the present disclosure. FIGS. 4A and 4B display different examples of tone mapping that can be selected, depending on the desired level of details for different luminance level ranges. Both tone mapping 400 and tone mapping 450 are mapping an image or frame with a luminance range of 1000 nits, e.g., the x-axis, to a display with a luminance capability of 500 nits, e.g., the y-axis. For instance, FIG. 4A displays that tone mapping curve 404 overlaps the intended luminance 402 of the input image until a high luminance level on the y-axis. As such, tone mapping curve 404 maintains the image's intended luminance for a wide range of luminance levels. Thus, tone mapping curve 404 favors accuracy of the image's brightness levels for a large range of luminance levels. As a result, tone mapping curve 404 can preserve details for low and middle luminance levels, but will cause high luminance levels to be more saturated. In contrast, FIG. 4B displays that tone mapping curve 454 overlaps the intended luminance 452 of the input image until a lower luminance level compared to tone mapping curve 404. Accordingly, tone mapping curve 454 attempts to better preserve details in high luminance regions by deviating from the intended luminance 452 of the input image at a lower luminance level compared to tone mapping curve 404. For example, when using tone mapping curve 404, the visual content is more accurate at for low and middle luminance levels, as tone mapping curve 404 aligns with the intended luminance 402 for these luminance levels. In contrast, tone mapping curve 454 deviates from the intended luminance 452 of the input image at a lower luminance level, such that the accuracy of the middle luminance levels may be sacrificed to preserve the details of high luminance levels.

In some aspects of the present disclosure, tone mapping curves can be designed for a specific visual scene. In these aspects, there is less compromise needed between maintaining luminance accuracy and preserving luminance details, as the tone mapping curve is specifically designed to benefit an individual scene or frame. The use of dynamic metadata may enable these tone mapping curves tailored to individual scenes, and thus avoid the aforementioned tone mapping compromise. Accordingly, tone mapping with dynamic metadata, i.e., dynamic tone mapping, can result in tone mapping that better fits individual scenes or frames. When using dynamic tone mapping, each frame may arrive at a content decoder with instructions on how to ideally tone map an upcoming scene or frame. In some instances, if a scene does not contain a high MaxCLL and its luminance range fits within the dynamic range of the visual display, then a high level of tonal compression can be avoided and the content can be displayed closer to the intended luminance levels of the scene or frame. For instance, dynamic metadata can help to preserve the artistic intent of a scene or frame by displaying the content closer to the intended luminance levels. Dynamic metadata can help achieve this even for panels or displays with a limited dynamic range.

In instances with multiple scenes including different brightness levels, each scene may be prepackaged with its own specific tone mapping instructions. As such, the present disclosure may eliminate guessing regarding which tone mapping curve should be used for a specific scene. Accordingly, some aspects of the present disclosure can utilize tone mapping curves in an efficient manner based on the needs of an individual scene or frame. Indeed, for specific scenes or frames, the present disclosure can identify an accurate, corresponding tone mapping curve.

In some aspects, the tone mapping function may be composed of two sections, such that the dynamic metadata uses a two piece curve to describe the required tone mapping. For instance, the dynamic metadata can prescribe, on a per-scene or pre-frame basis, that the mapping be applied in the form of a two piece tone mapping curve. In some instances, the lower section of the tone mapping curve can be a linear segment to enhance details in darker sections, such as shadows. For example, the first section of the tone mapping curve can be one shape, e.g., linear, while the second section of the tone mapping curve can be another shape, e.g., a curved polynomial. These two sections can be joined at a knee point ($K_x$, $K_y$), i.e., the point on the tone mapping curve where the first section ends and the second section begins. As such, the tone mapping curve can take one form prior to the knee point and another form after the knee point. In these instances, the metadata can contain the coordinates of the knee point and the coefficients for the polynomial.

Figure 5:
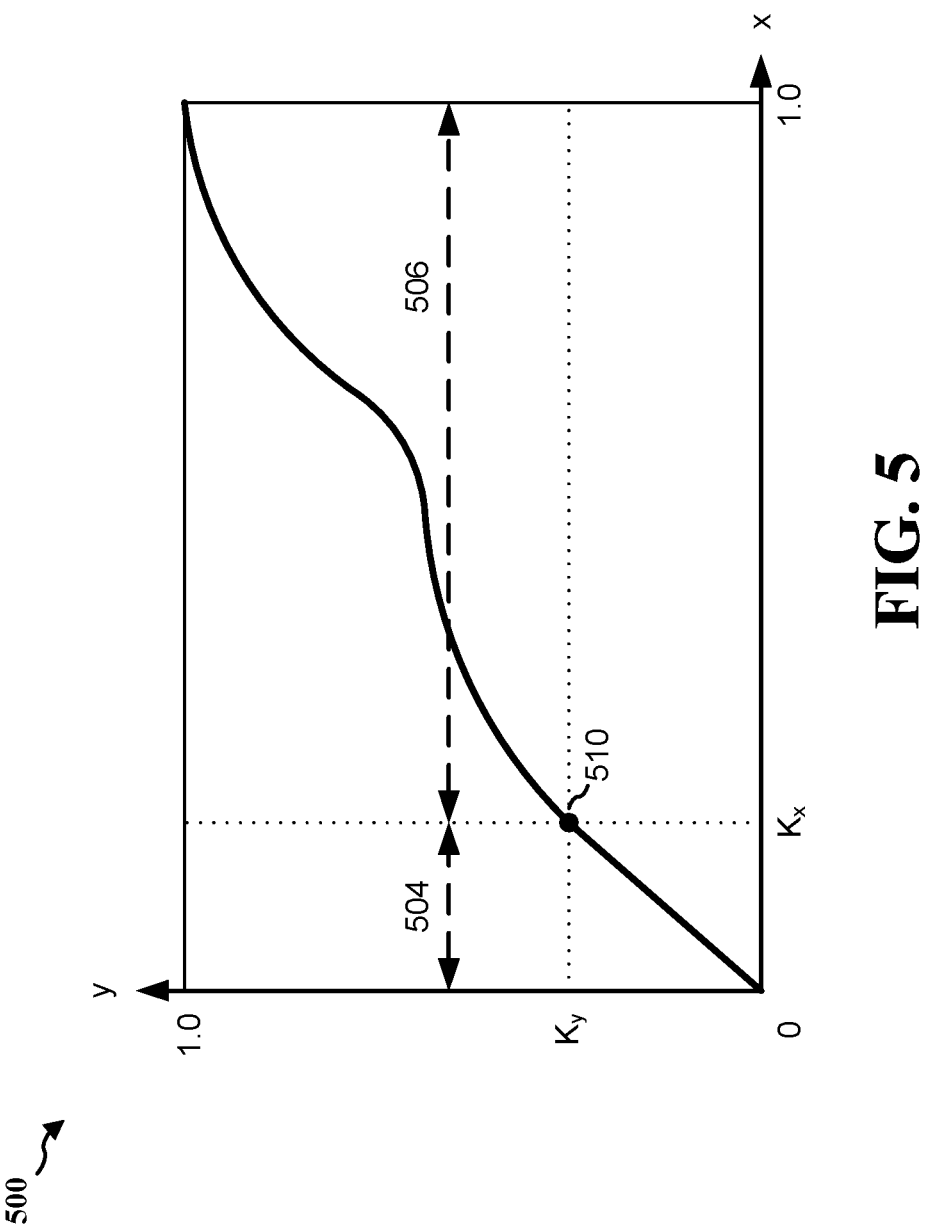
FIG. 5 illustrates another example of tone mapping according to the present disclosure.

FIG. 5 illustrates another example of tone mapping 500 according to the present disclosure. FIG. 5 displays tone mapping 500 including a first section 504, which runs from 0 to $K_x$ on the x-axis and 0 to $K_y$ on the y-axis, a second section 506, which runs from $K_x$ to 1.0 on the x-axis and from $K_y$ to 1.0 on the x-axis, and a knee point 510, which is the point ($K_x$, $K_y$) where first section 504 and second section 506 join together. As displayed in FIG. 5, first section 504 can be a linear segment that runs from the point (0, 0) on the x-axis and y-axis until the knee point 510 ($K_x$, $K_y$). The second section 506 can be a polynomial segment, e.g., a Bernstein polynomial or a Bezier curve, that runs from the knee point 510 ($K_x$, $K_y$) until the point (1.0, 1.0). Also, first section 504 can be referred to as a linear section and second section 506 can be referred to as an $N^{th}$ order curve section.

As shown in FIG. 5, tone mapping 500 can comprise two different segments before and after the knee point 510. This two piece curve in tone mapping 500 can be defined by the following equation:

$$y = f(x) = \begin{cases} \frac{K_y}{K_x} x, & 0 \leq x \leq K_x \\ K_y + (1 - K_y) B_N\left(\frac{x - K_x}{1 - K_x}\right), & K_x < x \leq 1 \end{cases}$$

As indicated above, the first section 504 can be a linear function defined by $$\frac{K_y}{K_x} x,$$

which runs from 0 to $K_x$ on the x-axis. The second section 506 can be a polynomial function defined by $$K_y + (1 - K_y) B_N\left(\frac{x - K_x}{1 - K_x}\right),$$

which runs from $K_x$ to 1 on the x-axis. Additionally, in the above equation, $$B_N(t) = \sum_{k=0}^{N} \binom{N}{k} t^k (1 - t)^{N-k} P_k.$$

This equation is an Nth degree Bernstein polynomial. Also, $P_0, \ldots, P_N$ are anchor parameters that characterize the curved part of the tone mapping function with $P_0=0$, $P_N=1$, and where $P_i$ for i=1, . . . , N−1 can satisfy the sufficient condition for monotonically increasing the curved section, such as through the following formula:

$$\frac{d}{dt} B_N(t) = \sum_{k=0}^{N} \binom{N}{k} t^{k-1} (1 - t)^{N-k-1} (k - Nt) P_k \geq 0, \forall t \in [0,1]$$

FIG. 5 shows the tone mapping curve ramping up from a value of 0. As mentioned previously, this value assumes that the display is capable of producing 0 nits. However, many commercially available displays cannot reproduce a luminance value of 0 nits. This is particularly true of liquid crystal displays (LCDs) where light leakage can limit practical contrast ratios to roughly 1000:1. One reason for this is that LCDs may not completely shut off the back light in the display. For example, an LCD with a 500 nit maximum luminance may have a 0.5 nit minimum luminance. In some instances, LCDs may have a minimum luminance of 0.3 nits. The difference between a 0 nit luminance and a slightly higher minimum luminance, e.g. 0.3-0.5 nits, can be fairly significant when viewing content in a dark environment on the display, such as content within dark shadows. For these reasons, tone mapping curves according to the present disclosure may not assume the minimum luminance of a display goes all the way to 0 nits.

In some aspects, the implicit assumption that all panels can produce a 0 nit luminance results in darker content being "lifted," which means that the display will render very dark or 0 nit luminance content at higher brightness levels than the artistic intent of the image or frame. As mentioned previously, the tone mapping can start at the minimum luminance levels of the display, which may be slightly above 0 nits. In some aspects, the darkest content can be mapped to the panel's minimum luminance, and the next darkest content can be mapped to the minimum luminance plus some delta value. Essentially, this can shift the tone mapping up from the minimum luminance level of the display. This can have the effect of reducing the overall contrast of the image. Accordingly, the darker luminance levels may appear lighter than they should, and the brighter luminance levels may reduce their ability to be distinguished. Thus, all the luminance levels may get shifted up a delta value of the minimum panel luminance, which, in some aspects, may cause high luminance values to be pushed together near the top of the luminance scale.

To address this issue of darker content being "lifted" or raised by the value of the minimum panel luminance, the present disclosure has modified the aforementioned tone mapping curve. This modification involves adding a third piece to the tone mapping curve to model a panel's minimum luminance. In some aspects, this section of the tone mapping curve can be used for low luminance levels, e.g., for brightness levels below the aforementioned linear segment, and be referred to as the "toe" of the tone mapping curve. This third piece to the tone mapping curve can utilize a lower slope at the lowest luminance levels, and slowly increase the slope to align with the linear section at higher luminance levels. By doing so, the third piece to the tone mapping curve can account for the darker content being "lifted" or raised by the value of the minimum panel luminance, such that it can more closely align with the intended luminance levels of the image or frame at lower luminance levels. Accordingly, the three piece tone mapping curve of the present disclosure can enable a video display to more closely align with the intended brightness levels over a wider range of luminance values. In some aspects, this three-piece tone mapping curve may not require any changes on the encoder side.

The present disclosure can utilize the three piece tone mapping curve in a number of different manners. For instance, it can be adopted by a relevant standard for tone mapping or it can be implemented by a display device independently. In some aspects, the three piece tone mapping curve can offer a content creator the creative freedom to control how the low luminance mapping is shaped via additional dynamic metadata parameters. Alternatively, the designer of a display device can control the shape of the low luminance levels or "toe" section independent of the content creation process. Although the toe section of the tone mapping curve can be defined in numerous ways, some aspects of the present disclosure can use a Bernstein polynomial or a Bezier curve similar to the one used in the upper end of the tonal range. Thus, in some aspects, the toe and the shoulder of the tone mapping curve can have the same mathematical basis for each function.

The present disclosure can add this extra section to the bottom end of the tone mapping curve to address darker sections of video content, e.g., shadows, and take into account a display panel's minimum luminance. In some aspects of film and video processing, tone mapping can be performed using an S-curve in the log domain. This can help to create a gradual nonlinear ramp-up in the darker sections of the tone mapping curve, e.g., shadows, which can preserve details in these sections. In the present disclosure, adding a Bezier curve section to the bottom of the tone mapping curve can also help to mimic the typical S-curve, allowing darker section details to be better preserved. By smoothly adding another Bezier section or Bernstein polynomial at the bottom of the tone mapping curve, the present disclosure can utilize a three piece curve that is able to address panel minimum luminance just as it can address maximum luminance. Accordingly, some aspects of the present disclosure can make a large impact on the lower luminance levels. As mentioned above, this third piece of the tone mapping curve may also be a polynomial, which can be added to help map the lower brightness levels as they approach a luminance of 0 nits.

Figure 6:
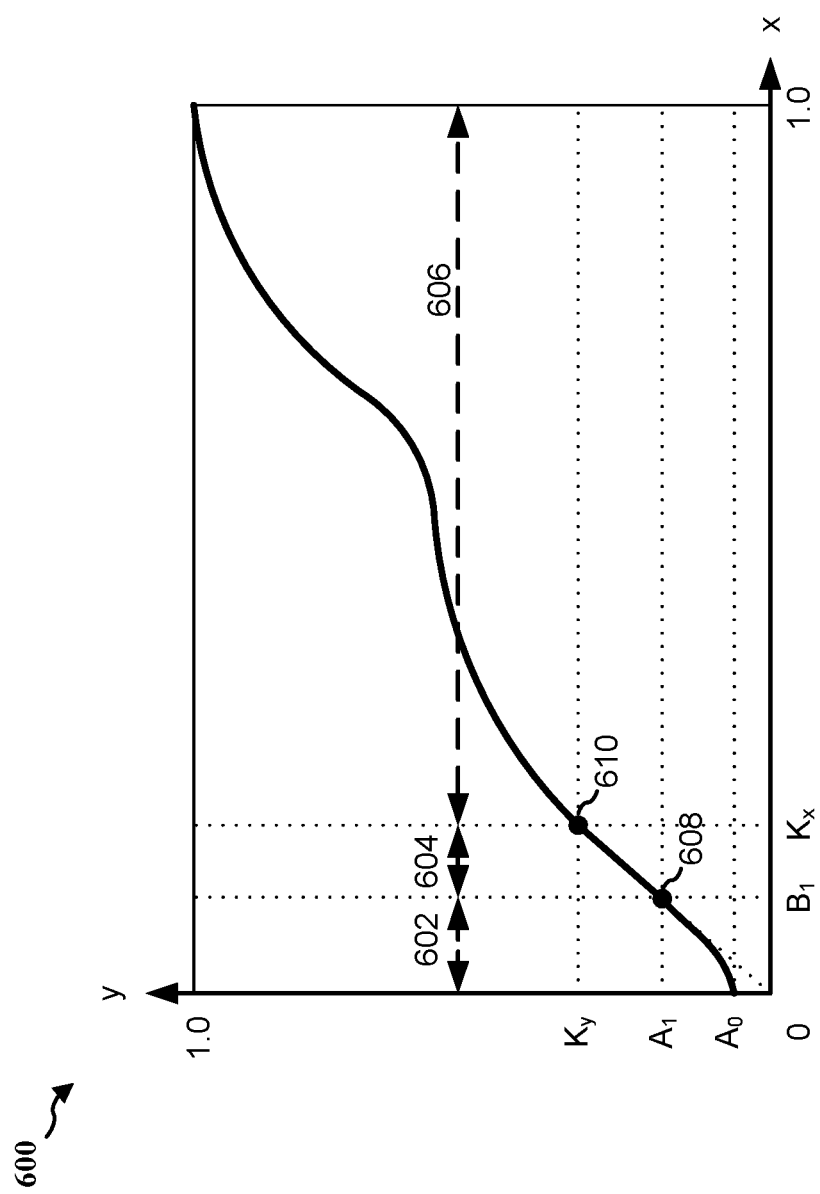
FIG. 6 illustrates another example of tone mapping according to the present disclosure.

FIG. 6 illustrates another example of tone mapping 600 according to the present disclosure. FIG. 6 displays tone mapping 600 including a first section 602, a second section 604, a third section 606, a lower junction point 608, and a knee point 610. As displayed in FIG. 6, first section 602 runs from 0 to $B_1$ on the x-axis and $A_0$ to $A_1$ on the y-axis, second section 604 runs from $B_1$ to $K_x$ on the x-axis and $A_1$ to $K_y$ on the y-axis, and third section 606 runs from $K_x$ to 1.0 on the x-axis and $K_y$ to 1.0 on the y-axis. Lower junction point 608 is the point $(B_1, A_1)$ where the first section 602 and the second section 604 join together, and knee point 610 is the point $(K_x, K_y)$ where the second section 604 and the third section 606 join together.

As displayed in FIG. 6, second section 604 can be a linear segment that runs from the lower junction point 608 $(B_1, A_1)$ until the knee point 610 $(K_x, K_y)$. The first section 602 can be a polynomial segment, e.g., a Bernstein polynomial or a Bezier curve, that runs from the point $(0, A_0)$ until the lower junction point 608 $(B_1, A_1)$. The third section 606 can also be a polynomial segment, e.g., a Bernstein polynomial or a Bezier curve, that runs from the knee point 610 $(K_x, K_y)$ until the point $(1.0, 1.0)$. Additionally, first section 602 can be referred to as a toe section, second section 604 can be referred to as a linear section, and third section 606 can be referred to as an $N^{th}$ order curve section.

As mentioned previously, tone mapping 600 can correspond to a method or apparatus for video processing that can obtain a video stream with a plurality of frames. For each of these frames, tone mapping 600 can help the present disclosure map a first luminance level associated with the frame, e.g., the x-axis in FIG. 6, to a second luminance level based on a transfer function, e.g., the y-axis in FIG. 6. The transfer function can include a first function for a first luminance level range, e.g., the first section 602, and another function for a second luminance level range, e.g., the third section 606. As shown in FIG. 6, the first section 602 can be a convex or concave polynomial and the third section 606 can be a concave or convex polynomial. As further shown in FIG. 6, second section 604 can be linear. Also, the slope of the first function 602 can be equal to the slope of the second function 604 at lower junction point 608. Further, the slope of the second function 604 can be equal to the slope of the third function 606 at knee point 610. For each of the frames that has been mapped with tone mapping 600, the method or apparatus for video processing can also indicate the second luminance level within the video stream.

As mentioned above and shown in FIG. 6, tone mapping 600 can comprise three different segments. This three piece curve in tone mapping 600 can be defined by the following equation:

$$y' = g(x) = \begin{cases} A_0 + (A_1 - A_0)B'_{N'}\left(\dfrac{x}{B_1}\right), & 0 \leq x \leq B_1 \\ \dfrac{K_y}{K_x}x, & B_1 < x \leq K_x \\ K_y + (1 - K_y)B_N\left(\dfrac{x - K_x}{1 - K_x}\right), & K_x < x \leq 1 \end{cases}$$

As indicated above, first section 602 can be a polynomial function defined by $$A_0 + (A_1 - A_0)B'_{N'}\left(\frac{x}{B_1}\right),$$

which runs from 0 to $B_1$ on the x-axis. Also, the second section 604 can be a linear function defined by $$\frac{K_y}{K_x}x,$$

which runs from $B_1$ to $K_x$ on the x-axis. The third section 606 can be a polynomial function defined by $$K_y + (1 - K_y)B_N\left(\frac{x - K_x}{1 - K_x}\right),$$

which runs from $K_x$ to 1.0 on the x-axis. Additionally, in the above equation, $$B_N(t) = \sum_{k=0}^{N}\binom{N}{k}t^k(1-t)^{N-k}P_k \text{ and } B'_{N'}(t) = \sum_{k=0}^{N'}\binom{N'}{k}t^k(1-t)^{N'-k}P'_k.$$

As mentioned previously, these equations are Nth degree Bernstein polynomials. Also, $P_0'$, ..., $P_{N'}'$, are anchor parameters that characterize the first section 602 or "toe" of the tone mapping function, where $P_0'=0$, $P_{N'}'=1$. The parameter $A_0$ represents the display's normalized minimum luminance: $A_0=L_{min}/L_{max}$. Also, by introducing a programmable toe height parameter, c, the present disclosure can define $A_1=cA_0$. By construction, the present disclosure can produce the following equations:

$$B_1 = A_1\frac{K_x}{K_y} = cA_0\frac{K_x}{K_y} = c\frac{L_{min}}{L_{max}}\frac{K_x}{K_y}.$$

In order to avoid banding artifacts, the present disclosure may ensure that the slope of the tone mapping curve is continuous. Thus, the derivative of the toe or first section 602 can equal the derivative of the linear section or second section 604 at $x=B_1$. This constraint can be evaluated as follows:

$$\frac{K_y}{K_x} = \left(\frac{A_1 - A_0}{B_1 - 0}\right)\frac{d}{dt}B'_{N'}(t)\bigg|_{t=1}$$

$$\frac{d}{dt}B'_{N'}(t)\bigg|_{t=1} = \left\{\sum_{k=0}^{N'}\binom{N'}{k}t^{k-1}(t-1)^{N'-k-1}(k-N't)P'_k\right\}\bigg|_{t=1}$$

In the above equation, all except two of the summation terms may go towards zero, where the exceptions are: $k=N'-1$ and $k=N'$. The above equations lead to the following calculations for $$\frac{d}{dt}B'_{N'}(t) := \left\{\binom{N'}{N'-1}t^{N'-2}(1-t)^0(N'-1-N't)P'_{N'-1} + \binom{N'}{N'}t^{N'-1}(1-t)^{N'-N'-1}(N'-N't)P'_{N'}\right\}\bigg|_{t=1} = $$

$$\left\{\frac{N'!}{(N'-1)!(N'-N'+1)!}t^{N'-2}(N'-1-N't)P'_{N'-1} + t^{N'-1}(1-t)^{-1}N'(1-t)P'_{N'}\right\}\bigg|_{t=1} = $$

$$-N'P'_{N'-1} + N'P'_{N'} = N'(1 - P'_{N'-1})$$

Combining the above equation with the equation for $$\frac{K_y}{K_x}$$

leads to:

$$\frac{K_y}{K_x} = \left(\frac{A_1 - A_0}{B_1 - 0}\right)N'(1 - P'_{N'-1})$$

$$\frac{K_y}{K_x} = \left(\frac{cA_0 - A_0}{cA_0\frac{K_x}{K_y}}\right)N'(1 - P'_{N'-1})$$

$$1 = \left(\frac{c-1}{c}\right)N'(1 - P'_{N'-1})$$

$$\boxed{P'_{N'-1} = 1 - \frac{c}{N'(c-1)}}$$

As mentioned previously, $P_0'$, ..., $P_{N'}'$, are anchor parameters that characterize the "toe" or first section 602 of the tone mapping function. The constraints in the above equations are $$P'_0 = 0, P'_{N'} = 1, P'_{N'-1} = 1 - \frac{c}{N'(c-1)},$$

and $P'_i$ for $i=1, \ldots, N'-2$. These constraints can satisfy the sufficient condition for monotonically increasing the toe or first section 602, such as:

$$\frac{d}{dt}B'_{N'}(t) = \sum_{k=0}^{N'}\binom{N'}{k}t^{k-1}(1-t)^{N'-k-1}(k-N't)P'_k \geq 0, \forall t \in [0,1]$$

Based on the above, the present disclosure can define the toe section or first section and the constraints required for a continuous slope of this section. However, in some instances, the enhanced tone mapping function may not be used directly to drive a display. The present disclosure can also normalize the tone mapping curve such that a range of $[A_0, 1]$ on the y-axis in FIG. 6 actually maps to a range of $[0, 1]$ on the y-axis.

Figure 7:
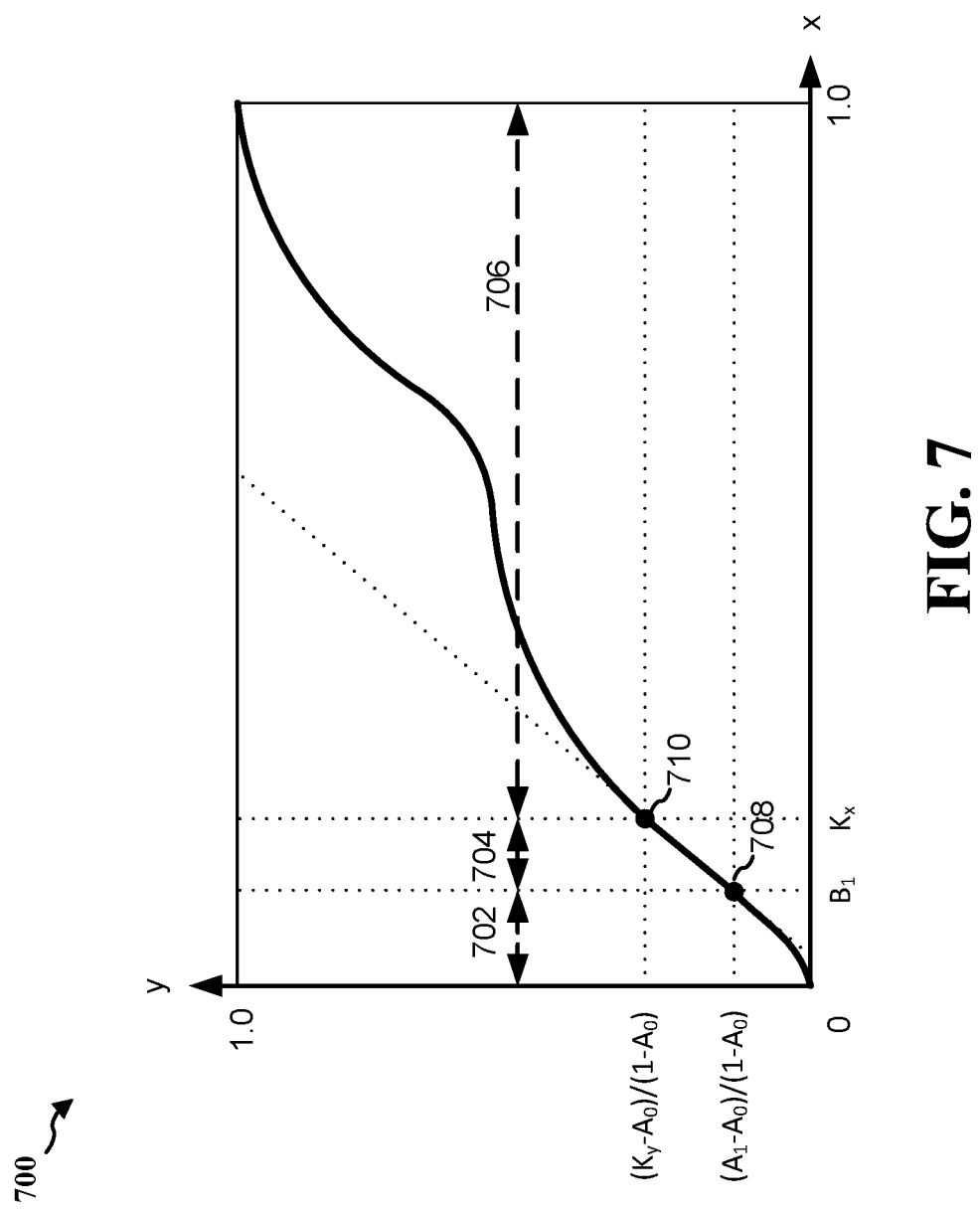
FIG. 7 illustrates another example of tone mapping according to the present disclosure.

FIG. 7 illustrates another example of tone mapping 700 according to the present disclosure. Similar to FIG. 6 above, FIG. 7 displays tone mapping 700 including a first section 702, a second section 704, a third section 706, a lower junction point 708, and a knee point 710. As indicated above, FIG. 7 represents the normalization of the tone mapping curve that maps to a range of [0, 1] on the y-axis. As displayed in FIG. 7, first section 702 runs from 0 to $B_1$ on the x-axis and 0 to $(A_1-A_0)/(1-A_0)$ on the y-axis, second section 704 runs from $B_1$ to $K_x$ on the x-axis and $(A_1-A_0)/(1-A_0)$ to $(K_y-A_0)/(1-A_0)$ on the y-axis, and third section 706 runs from $K_x$ to 1.0 on the x-axis and $(K_y-A_0)/(1-A_0)$ to 1.0 on the y-axis. Lower junction point 708 is the point $(B_1, (A_1-A_0)/(1-A_0))$ where the first section 702 and the second section 704 join together, and knee point 710 is the point $(K_x, (K_y-A_0)/(1-A_0))$ where the second section 704 and the third section 706 join together.

As displayed in FIG. 7, second section 704 can be a linear segment that runs from the lower junction point 708 $(B_1, (A_1-A_0)/(1-A_0))$ until the knee point 710 $(K_x, (K_y-A_0)/(1-A_0))$. The first section 702 can be a polynomial segment, e.g., a Bernstein polynomial or a Bezier curve, that runs from the point (0, 0) until the lower junction point 708 $(B_1, (A_1-A_0)/(1-A_0))$. The third section 706 can also be a polynomial segment, e.g., a Bernstein polynomial or a Bezier curve, that runs from the knee point 710 $(K_x, (K_y-A_0)/(1-A_0))$ until the point (1.0, 1.0). Moreover, first section 702 can be referred to as a toe section, second section 704 can be referred to as a linear section, and third section 706 can be referred to as an $N^{th}$ order curve section.

As mentioned herein, tone mapping 700 can correspond to a method or apparatus for video processing that can obtain a video stream with a plurality of frames. For each of these frames, tone mapping 700 can help the present disclosure map a first luminance level associated with the frame, e.g., the x-axis in FIG. 7, to a second luminance level based on a transfer function, e.g., the y-axis in FIG. 7. The transfer function can include a first function for a first luminance level range, e.g., the first section 702, and another function for a second luminance level range, e.g., the third section 706. As shown in FIG. 7, the first section 702 can be a convex or concave polynomial and the third section 706 can be a concave or convex polynomial. FIG. 7 also shows that the transfer function can include a third function for a third luminance level range, e.g., the second section 704. As further shown in FIG. 7, second section 704 can be linear. Also, the slope of the first function 702 can be equal to the slope of the second function 704 at lower junction point 708. Further, the slope of the second function 704 can be equal to the slope of the third function 706 at knee point 710. For each of the frames that has been mapped with tone mapping 700, the method or apparatus for video processing can also indicate the second luminance level within the video stream.

As shown in FIG. 7, tone mapping 700 can comprise three different segments. This three piece curve in tone mapping 700 can be defined by the following equations:

$$y'' = h(x) = \frac{g(x)A_0}{1-A_0} =$$

$$\frac{y'-A_0}{1-A_0}y'' = h(x) = \begin{cases} \left(\frac{A_1-A_0}{1-A_0}\right)B'_{N'}\left(\frac{x}{B_1}\right) & 0 \le x \le B_1 \\ \frac{\frac{K_y}{K_x}x - A_0}{1-A_0}, & B_1 < x \le K_x \\ \frac{K_y - A_0 + (1-K_y)B_N\left(\frac{x-K_x}{1-K_x}\right)}{1-A_0}, & K_x < x \le 1 \end{cases}$$

As indicated above, first section 702 can be a polynomial function defined by $$\left(\frac{A_1-A_0}{1-A_0}\right)B'_{N'}\left(\frac{x}{B_1}\right),$$

which runs from 0 to $B_1$ on the x-axis. The second section 704 can be a linear function defined by $$\frac{\frac{K_y}{K_x}x - A_0}{1-A_0},$$

which runs from $B_1$ to $K_x$ the x-axis. Also, the third section 706 can be a polynomial function defined by $$\frac{K_y - A_0 + (1-K_y)B_N\left(\frac{x-K_x}{1-K_x}\right)}{1-A_0},$$

which runs from $K_x$ to 1 on the x-axis. Additionally, in the above equation, $$B_N(t) = \sum_{k=0}^{N}\binom{N}{k}t^k(1-t)^{N-k}P_k \text{ and } B'_{N'}(t) = \sum_{k=0}^{N'}\binom{N'}{k}t^k(1-t)^{N'-k}P'_k.$$

As mentioned above, FIG. 7 represents an enhanced tone mapping 700 after the normalization of a tone mapping curve. By normalizing the curve, tone mapping 700 can begin mapping at the point (0, 0), i.e., at 0 on the y-axis. In some aspects, the linear segment may be missing if, for example, the knee point 710 were defined to be at the origin point (0, 0). In some aspects, the toe section or first section 702 of the present disclosure may intersect the $N^{th}$ order section or third section 706. Accordingly, this can result in some instances of the present disclosure eliminating the linear section or second section 704. A similar derivation can be applied to determine the constraints to ensure a continuous slope is maintained at the intersection.

As mentioned above, the tone mapping 700 includes three different segments to form a three piece curve. These three curve segments include the toe section or first section 702 for low luminance levels, the linear section or second section 704 for middle luminance levels, and the $N^{th}$ order curve section or third section 706 for high luminance levels. For example, the first section 702 can target low luminance levels, e.g., shadows, by using a Bernstein polynomial or Bezier curve, the second section 704 can target middle luminance levels, e.g., grass, by using a linear segment, and the third section 706 can target high luminance levels, e.g., sunlight, by using a Bernstein polynomial or Bezier curve. Accordingly, the first section 702 can address the panel minimum luminance and low luminance levels that may have been otherwise undistinguished through the use of a Bernstein polynomial. This curved polynomial section of the first section 702 may also derive its curve equations to maintain smoothness between other segments, e.g., over a range of different parameters.

In some aspects, the tone mapping curves of the present disclosure can be a tradeoff between the ideal content display and the capabilities of the actual display. As indicated previously, the tone mapping curves herein can hug the panel minimum luminance until the ideal luminance value catches up. By using a polynomial function and distinguishing some details in the lower luminance values, the present disclosure can avoid the aforementioned clipping at lower luminance values. In some instances, the formulation of tone mapping curves herein can begin with a smooth, gradual increase from the panel's minimum luminance and then smoothly combine and intersect with the existing portions of the tone mapping curve. By doing so the combined portion of the two intersecting segments can have the same slope. Therefore, the intersection of these segments can be continuous such that the derivative at this intersection can be the same for both segments. Essentially, the present disclosure can match the slope of the lower, toe section to the slope of the middle, linear section. Likewise, the present disclosure can match the slope of the middle, linear section to the slope of the upper, $N^{th}$ order curve section. By doing so, the present disclosure can avoid banding artifacts in the video display, but it may require certain constraints on the Bezier coefficients to meet the mathematical criteria. As mentioned above, the present disclosure includes the formulation and calculation of this mathematical criteria.

In other aspects, the toe section that is used to represent the lower luminance levels of the tone mapping may not be a Bernstein polynomial. For example, the toe section can be linear function, by using the same or a different slope compared to the linear section for middle luminance levels. In addition, in some aspects, the tone mapping curve can utilize a logarithmic scale. Accordingly, the x-axis and the y-axis can use logarithmic values. In these instances, the x-axis and the y-axis may still represent nit values, but they may be altered to represent nits on a logarithmic scale.

As indicated above, FIGS. 6 and 7 display how the present disclosure can modify a tone mapping curve based on a panel's peak and minimum luminance, such as through curve adaptation and generation. In some aspects, the toe section near the lower end of the tone mapping curve can address a panel's minimum luminance. However, the present disclosure is concerned with both high and low brightness levels on the tone mapping curve, which are both important to viewers of a display. Additionally, tone mapping curves according to the present disclosure can change based on the type of display. For instance, the present disclosure can measure the panel luminance and then plug-in the corresponding values. By doing so, the proper tone mapping curve for the appropriate brightness levels can be output.

Figure 8:
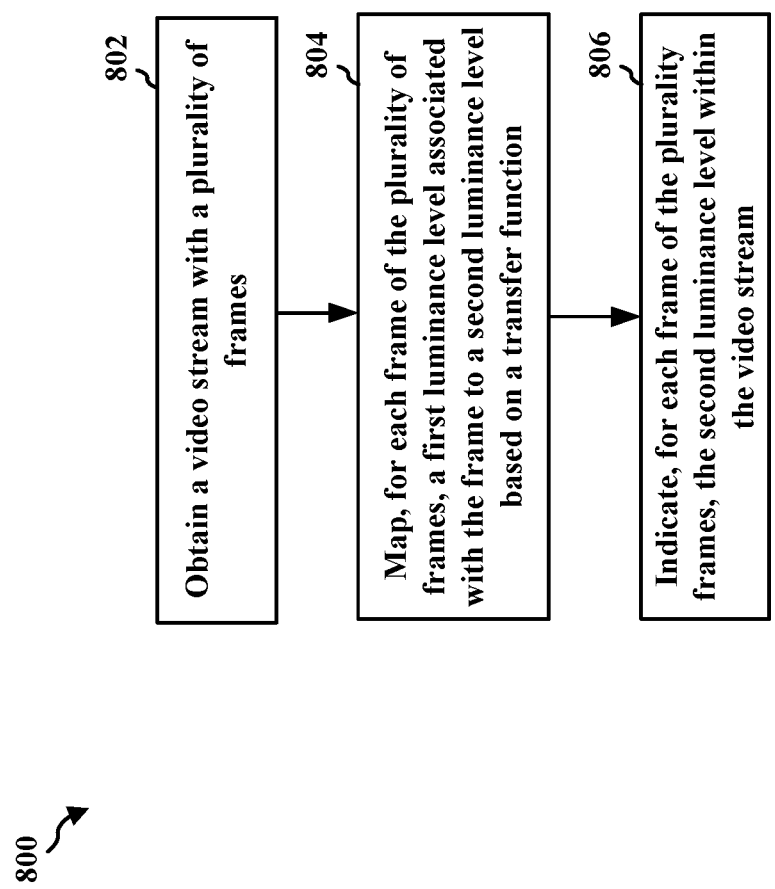
FIG. 8 illustrates an example flowchart of an example method in accordance with one or more techniques of this disclosure.

FIG. 8 illustrates an example flowchart 800 of an example method in accordance with one or more techniques of this disclosure. The method may be performed by a video processor or apparatus for video processing. At 802, the apparatus may obtain a video stream with a plurality of frames, as described in connection with the examples in FIGS. 6 and 7. At 804, the apparatus can map, for each frame of the plurality of frames, a first luminance level associated with the frame to a second luminance level based on a transfer function, as mentioned in connection with FIGS. 6 and 7. For example, as shown in FIGS. 6 and 7, tone mapping 600/700 can help to map a first luminance level associated with the frame, e.g., the x-axis in FIGS. 6 and 7, to a second luminance level based on a transfer function, e.g., the y-axis in FIGS. 6 and 7. In some aspects, the transfer function can include a first function for a first luminance level range and a second function for a second luminance level range, as described in connection with FIGS. 6 and 7.

For example, as shown in FIGS. 6 and 7, the transfer function can include a first function for a first luminance level range, e.g., the first section 602/702, and another function for a second luminance level range, e.g., the third section 606/706. Additionally, the first function can be non-linear and the second function can be a polynomial, as mentioned in connection with the examples in FIGS. 6 and 7.

In some aspects, the first function can be a polynomial, as described in connection with FIGS. 6 and 7. Also, the first function can be convex and the second function can be concave, as mentioned in connection with the examples in FIGS. 6 and 7. As shown in FIGS. 6 and 7, the first section 602/702 can be a convex or concave polynomial and the third section 606/706 can be a concave or convex polynomial. Moreover, the first function can be a Bernstein polynomial and/or the second function can be a Bernstein polynomial, as described in connection with FIGS. 6 and 7. In addition, the first luminance level range can be between 0 and some value, e.g., $x_1$, and the second luminance level range can be greater than that value, e.g., $x_1$, as mentioned in connection with the examples in FIGS. 6 and 7. Further, a slope of the first function at a luminance level of some value, e.g., $x_1$, can be equal to a slope of the second function at a luminance level of that value, e.g., $x_1$, as described in connection with FIGS. 6 and 7.

Additionally, in some aspects, the transfer function may include a third function for a third luminance level range. FIGS. 6 and 7 shows that the transfer function can include a third function for a third luminance level range, e.g., the second section 604/704. In these aspects, the first luminance level range can be between 0 and some value, e.g., $x_1$, the third luminance level range can be between that value, e.g., $x_1$, and another value, e.g., $x_2$, and the second luminance level range can be greater than the other value, e.g., $x_2$, as described in connection with the first section 602/702, the second section 604/704, and the third section 606/706 in FIGS. 6 and 7. Further, the third function can be linear, as mentioned in connection with the examples in FIGS. 6 and 7. Also, the slope of the first function at a luminance level of some value, e.g., $x_1$, can be equal to a slope of the third function at a luminance level of that value, e.g., $x_1$, as described in connection with FIGS. 6 and 7. Moreover, the a slope of the third function at a luminance level of another value, e.g., $x_2$, can be equal to a slope of the second function at a luminance level of the other value, e.g., $x_2$, as described in connection with the examples in FIGS. 6 and 7.

At 806, the apparatus can indicate, for each frame of the plurality frames, the second luminance level within the video stream.

In one configuration, a method or apparatus for video processing is provided. The apparatus may be a video processor or some other processor in a GPU. In one aspect, the apparatus may be the processing unit 120 within the device 104, the processing unit 106 within the device 102, or may be some other hardware within devices 102/104 or another device. The apparatus may include means for obtaining a video stream with a plurality of frames. The apparatus can also include means for mapping, for each frame of the plurality of frames, a first luminance level associated with the frame to a second luminance level based on a transfer function. In some aspects, the transfer function can include a first function for a first luminance level range and a second function for a second luminance level range. Additionally, the first function can be non-linear and the second function can be polynomial. The apparatus can also include means for indicating, for each frame of the plurality frames, the second luminance level within the video stream.

The subject matter described herein can be implemented to realize one or more benefits or advantages. For instance, the described tone mapping techniques can be used by video processors or other processors to help improve the corresponding visual displays. Systems or processors described herein can utilize tone mapping to improve the display of low or high luminance levels. For example, the present disclosure can improve the display of minimum luminance and low luminance levels that may have been otherwise undistinguishable or, alternatively, may have been otherwise rendered brighter than the creative intent. The present disclosure can also help to distinguish high luminance levels. By helping to distinguish details in lower and/or higher luminance values, the present disclosure can avoid unwanted clipping at these luminance values.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of video processing, comprising:
    obtaining a video stream with a plurality of frames;
    mapping, for each frame of the plurality of frames, a first luminance level associated with the frame to a second luminance level based on a transfer function, the transfer function including a first function for a first luminance level range, a second function for a second luminance level range, and a third function for a third luminance level range, the first function being non-linear and the second function being polynomial; and
    indicating, for each frame of the plurality frames, the second luminance level within the video stream.

2. The method of claim 1, wherein the first function is a polynomial.

3. The method of claim 2, wherein the first function is convex and the second function is concave.

4. The method of claim 3, wherein the first function is a Bernstein polynomial and the second function is a Bernstein polynomial.

5. The method of claim 1, wherein the first luminance level range is between 0 and $x_1$ and the second luminance level range is greater than $x_1$.

6. The method of claim 5, wherein a slope of the first function at a luminance level of $x_1$ is equal to a slope of the second function at a luminance level of $x_1$.

7. The method of claim 1, wherein the first luminance level range is between 0 and $x_1$, the third luminance level range is between $x_1$ and $x_2$, and the second luminance level range is greater than $x_2$ and less than or equal to 1.0.

8. The method of claim 7, wherein the third function is linear.

9. The method of claim 8, wherein a slope of the first function at a luminance level of $x_1$ is equal to a slope of the third function at a luminance level of $x_1$.

10. The method of claim 8, where a slope of the third function at a luminance level of $x_2$ is equal to a slope of the second function at a luminance level of $x_2$.

11. An apparatus for video processing, comprising:
    a memory; and
    at least one processor coupled to the memory and configured to:
        obtain a video stream with a plurality of frames;
        map, for each frame of the plurality of frames, a first luminance level associated with the frame to a second luminance level based on a transfer function, the transfer function including a first function for a first luminance level range, a second function for a second luminance level range, and a third function for a third luminance level range, the first function being non-linear and the second function being polynomial; and indicate, for each frame of the plurality frames, the second luminance level within the video stream.

12. The apparatus of claim 11, wherein the first function is a polynomial.

13. The apparatus of claim 12, wherein the first function is convex and the second function is concave.

14. The apparatus of claim 13, wherein the first function is a Bernstein polynomial and the second function is a Bernstein polynomial.

15. The apparatus of claim 11, wherein the first luminance level range is between 0 and $x_1$ and the second luminance level range is greater than $x_1$.

16. The apparatus of claim 15, wherein a slope of the first function at a luminance level of $x_1$ is equal to a slope of the second function at a luminance level of $x_1$.

17. The apparatus of claim 11, wherein the first luminance level range is between 0 and $x_1$, the third luminance level range is between $x_1$ and $x_2$, and the second luminance level range is greater than $x_2$ and less than or equal to 1.0.

18. The apparatus of claim 17, wherein the third function is linear.

19. The apparatus of claim 18, wherein a slope of the first function at a luminance level of $x_1$ is equal to a slope of the third function at a luminance level of $x_1$.

20. The apparatus of claim 18, wherein a slope of the third function at a luminance level of $x_2$ is equal to a slope of the second function at a luminance level of $x_2$.

21. An apparatus for video processing, comprising:
means for obtaining a video stream with a plurality of frames;
means for mapping, for each frame of the plurality of frames, a first luminance level associated with the frame to a second luminance level based on a transfer function, the transfer function including a first function for a first luminance level range, a second function for a second luminance level range, and a third function for a third luminance level range, the first function being non-linear and the second function being polynomial; and means for indicating, for each frame of the plurality frames, the second luminance level within the video stream.

22. The apparatus of claim 21, wherein the first function is a polynomial.

23. The apparatus of claim 22, wherein the first function is convex and the second function is concave.

24. The apparatus of claim 23, wherein the first function is a Bernstein polynomial and the second function is a Bernstein polynomial.

25. The apparatus of claim 21, wherein the first luminance level range is between 0 and $x_1$ and the second luminance level range is greater than $x_1$.

26. The apparatus of claim 25, wherein a slope of the first function at a luminance level of $x_1$ is equal to a slope of the second function at a luminance level of $x_1$.

27. The apparatus of claim 21, wherein the first luminance level range is between 0 and $x_1$, the third luminance level range is between $x_1$ and $x_2$, and the second luminance level range is greater than $x_2$ and less than or equal to 1.0 wherein the third function is linear.

28. The apparatus of claim 27, wherein a slope of the first function at a luminance level of $x_1$ is equal to a slope of the third function at a luminance level of $x_1$.

29. The apparatus of claim 27, wherein a slope of the third function at a luminance level of $x_2$ is equal to a slope of the second function at a luminance level of $x_2$.

30. A computer-readable medium storing computer executable code for video processing, comprising code to:
obtain a video stream with a plurality of frames;
map, for each frame of the plurality of frames, a first luminance level associated with the frame to a second luminance level based on a transfer function, the transfer function including a first function for a first luminance level range, a second function for a second luminance level range, and a third function for a third luminance level range, the first function being non-linear and the second function being polynomial; and
indicate, for each frame of the plurality frames, the second luminance level within the video stream.

* * * * *